Jan. 29, 1974 — B. SHAW — 3,788,830

BULB MAKING METHOD

Filed Nov. 9, 1971 — 2 Sheets-Sheet 1

Inventor:
Bernard Shaw
by Henry P. Truesdell
His Attorney

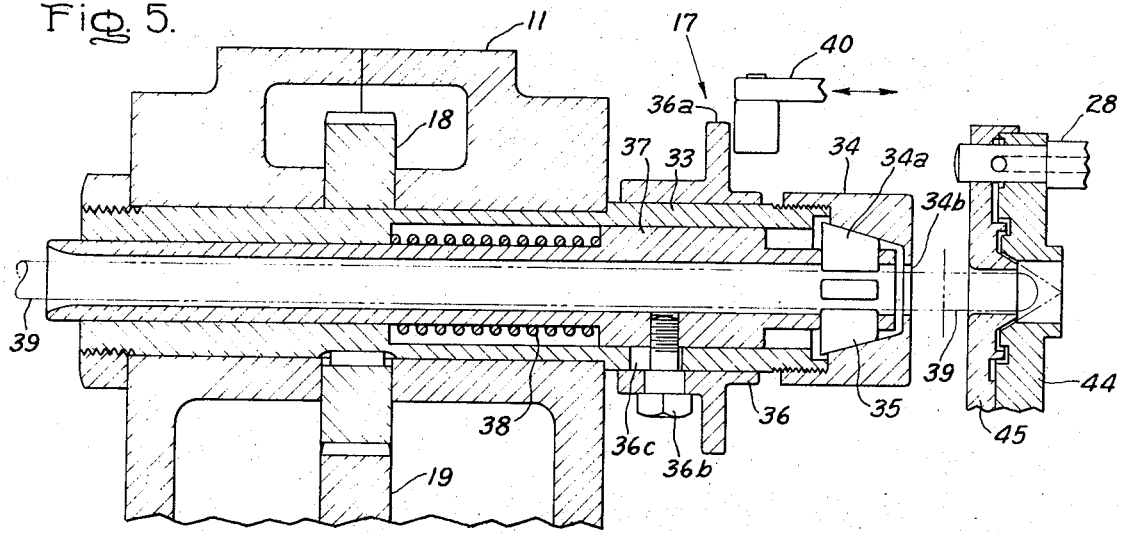

United States Patent Office 3,788,830
Patented Jan. 29, 1974

3,788,830
BULB MAKING METHOD
Bernard Shaw, Mayfield Heights, Ohio, assignor to
General Electric Company
Filed Nov. 9, 1971, Ser. No. 196,927
Int. Cl. C03b 23/04, 29/00
U.S. Cl. 65—110          2 Claims

ABSTRACT OF THE DISCLOSURE

An apparatus and method for forming bulbs from heated glass tubing in which the tubing is placed inside a forming head cavity where a molten end wall of the tubing is shaped to bulb form through the action of a vacuum created by the effect of gas flow over the end wall.

BACKGROUND OF THE INVENTION

(1) Field of the invention

The invention relates to an apparatus and method for forming bulbs from glass tubing or other ceramic material. More particularly, the invention relates to the use of a partial vacuum, created by the flow of pressurized gas, to shape heated tubing into a bulb.

(2) Description of the prior art

Prior art devices for forming bulbs from tubing are of two general types, air pressure-mold or vacuum-mold. In air pressure-mold devices, an air pressure hose is connected to the open end of a stick of glass tubing, the other end of which has been heated and closed. After the heated end has been placed in a mold, air pressure is applied to the interior of the tube to force the molten glass against the contour of the mold.

The vacuum-mold apparatus, a two-piece mold is placed around heated closed tubing to form an air-tight seal. A vacuum is created in a portion of the mold cavity. Atmospheric pressure within the tubing pushes the molten closed tubing out against the partial vacuum until the tubing contacts the mold walls. In both types of apparatus the mold is split so that the formed bulb can be removed.

Inherent in the use of both types of apparatus is their lack of speed due to the time-consuming operations of connecting and disconnecting air or vacuum lines, opening and closing of molds and pumping to create a vacuum or pressure.

SUMMARY OF THE INVENTION

It is an object of the invention to provide a bulb-making apparatus and method which produces quality bulbs at higher speeds.

In accordance with one aspect of the invention, an apparatus is provided with a forming head, not in direct contact with the ceramic tubing, which contains passageways for pressurized air or gas to flow through and into the cavity of the forming head. The forming head is placed over a closed molten end of the tubing so that flow of gas from the passageways creates a partial vacuum in front of the heated molten end of the tubing. Atmospheric pressure on the interior of the tubing wall then enlarges or forms the molten end of the tubing to bulb shape within the forming head.

In adapting the apparatus to continuous processing, heating and closing of several lengths of tubing is accomplished on multiple chucks of a rotatable turret. Sticks of tubing are held by a plurality of rotating chucks on the turret and project beyond the chucks so that several forming heads may be reciprocated into position over several ends of the extended tubing for bulb forming and then withdrawn as the turret indexes. When the bulb has been formed, it is removed from the forming head and cut from the length of tubing as a completed bulb.

BRIEF DESCRIPTION OF THE DRAWINGS

FIG. 5 is a fragmentary section view showing one of the chucks for holding tubing in alignment with the forming head.

DESCRIPTION OF THE PREFERRED EMBODIMENTS

Figure 1:
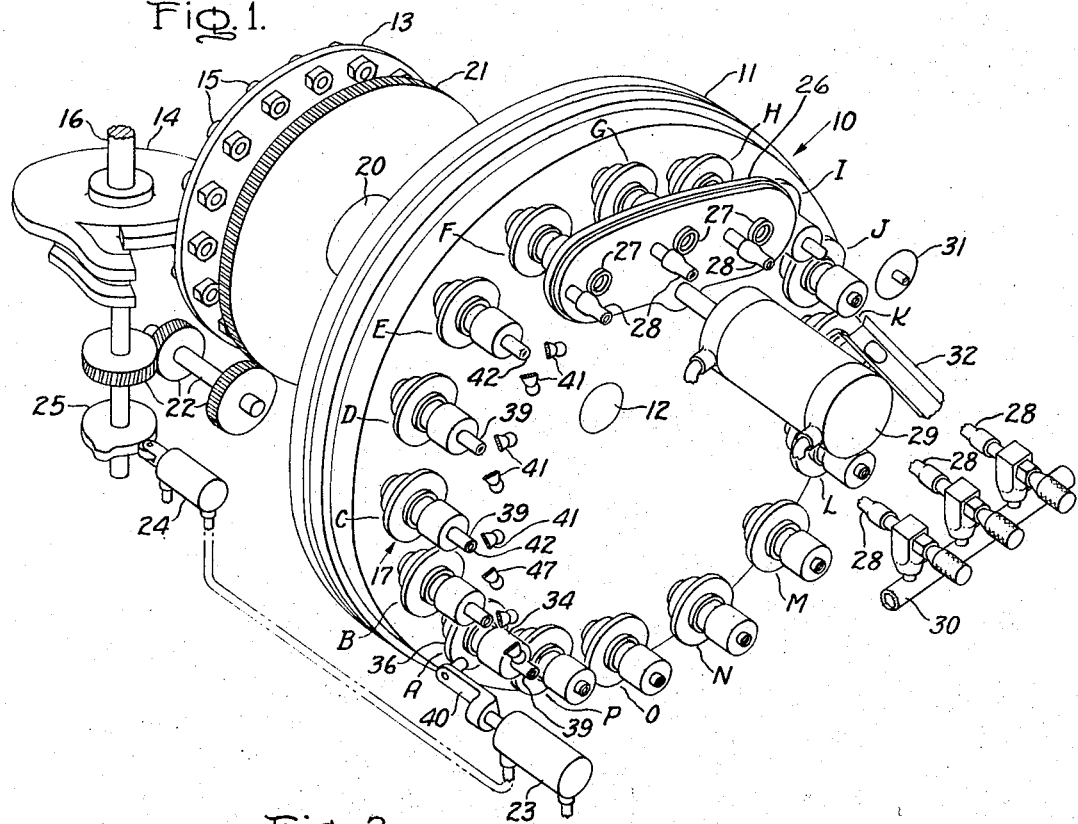
FIG. 1 is a perspective view of a multiple head machine embodying the invention.

FIG. 1 illustrates a bulb-making apparatus 10 having a turret 11 mounted on a rotatable drive shaft 12. Disc 13 is connected to shaft 12 at its center and is indexed by cam 14 when the cam contacts rollers 15 mounted on the disc so that turret 11 is rotated through shaft 12 and indexed clockwise in the showing of FIG. 1. Cam 14 is connected to a drive shaft 16 for power transmission. The cam is designed such that it will index the turret at a predetermined time corresponding to processing time at each work station.

A plurality of chucks 17 are rotatably mounted on turret 11 and serve to hold a plurality of lengths of ceramic or glass tubing for processing into bulb shape.

As shown in FIG. 5, rotational force is transmitted to chuck 17 through a spur gear 18 which is meshed with spur gear 19 attached to the chuck. Spur gear 19 is attached to sleeve 20 which is rotated by gear 21 fastened to shaft 20, gear 21 being turned by gearing mechanism 22, also conected to the main drive shaft 16. In order to open chuck 17 to receive a length of tubing, an air cylinder 23 engages the chuck 17 at a predetermined time, in a manner to be described later, and is actuated by an air valve 24 when cam 25 attached to the main drive shaft opens valve 24.

A reciprocable housing 26 contains three forming heads 27 supplied by air under pressure through air supply lines 28. Air cylinder 29 moves the housing and forming heads toward and away from turret 11 in a reciprocating motion in timed sequence with rotation of turret 11. Supply manifold 30 provides pressurized gas to lines 28. Cut off wheel 31 separates the finished bulb from the tubing stock in chuck 17 and the finished bulb then drops into chute 32. The tubing end retained by chuck 17 is ready to be processed again.

The turret 11 carries sixteen chucks 17 the details of which are illustrated in FIG. 5. Each chuck 17 is provided with a sleeve 33 rotatable on the turret 11 and to which spur gear 18 is fastened for rotating the chuck. A cap 34 carried by the sleeve is formed with a recess having tapered surfaces 34a for engaging jaw blocks 35 and with an opening 34b. Jaw blocks 35 slide laterally on a hollow cylinder 37 centered within sleeve 33 the cylinder 37 being movable by spring 38 to bring the jaws into engagement with taper surface 34a. In such position the jaws grip a length of ceramic tubing 39 centered in the hollow cylinder 37 and projecting through opening 34b for the bulb-forming operations to be described. A collar 36 having a flange 36a slides laterally on sleeve 33 and is fastened by bolt 36b to the interior sleeve 37. An arm 40, actuated by air cylinder 23, engages flange 36a to move the collar and cylinder 37 against the action of spring 38 to release the jaws from gripping the glass tubing. Bolt 36b moves in slot 36c formed in sleeve 33.

In operation of the turret as shown in FIG. 1, at position A the length of glass tubing 39 is advanced a predetermined distance by a conventional advancing mechanism, not shown. Before the turret is ready to index, cam 25 opens valve 24 which causes the cylinder plunger 40 to retract from contact with collar 36. Jaw blocks 35 then close upon the tubing by the action of spring 38. Following this, turret 11 is indexed through the action of cam 14 to move the clamped tubing to position B where heating means such as burners 41 are positioned to heat the tube end 42.

Figures 2, 3:
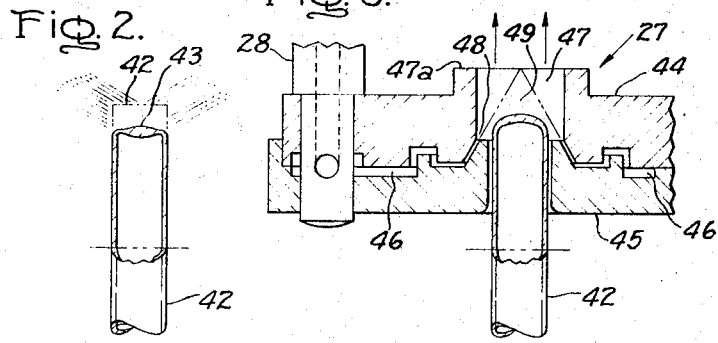
FIG. 2 is a fragmentary section view of tubing before and after it has been heated and its end closed.
FIG. 3 is a section view of the mold of the invention showing a partially formed bulb.

As the turret continues to rotate, and the clamped tubing reaches station C, additional burners 41 apply heat to the tube walls which become plastic. Tube end 42 begins to collapse and close at station D. At station E, tube end 42 is completely closed. This transformation of tube end 42, accomplished by the succession of burner fires at stations B through E is illustrated in FIG. 2. When the end is closed, there is a tendency for the glass to melt into a thicker bead-like portion 43 at the center formed by the overlap of the walls. The closed tube is now ready for the first forming operation.

Figure 4:
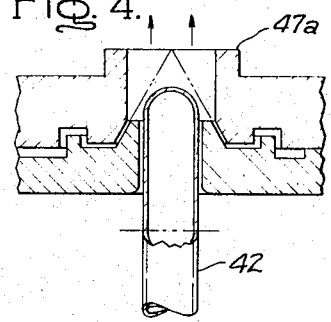
FIG. 4 is a section view of the mold of the invention showing a completed bulb.

FIGS. 3 and 4 illustrate two of the three forming heads 27 carried by the reciprocating housing 26. As soon as the clamped tubing with its molten closed end is moved to station F, the housing 26 is moved by air cylinder 29 toward the turret, to place one of the forming heads over the extending end of the tube, as shown by FIG. 3. The forming head 27 is constructed in two parts, a body 44 and a cover 45. The body and cover are shaped such that when they are joined, they form an annular passageway 46 and a cavity 47 formed in a collar 47a. The terminal ends 48 of passageways 46 are set at an angle to the axis of the cavity 47. This angle must be sufficiently large such that the gas stream fed through supply line 28 does not contact the now plastic end 42 of the tube. As the pressurized gas is propelled out of the cavity, shown by arrows, a partial vacuum is created in the area 49 just above the tip. The pressure inside the tube is atmospheric and the consequent difference in pressure between the inside and outside of the tube forces the flattened end to elongate into a bulb form. As previously indicated, the chuck rotates during the bulb-forming operation so that the action of the air jets is uniform around the perimeter of the tubing. The terminal ends 48 of the passageways may be formed as a single annular orifice or as a circular arrangement of individual jet openings.

In the embodiment illustrated in FIG. 1, the elongation of the closed end of the tube occurs at three stations (F, G, H). FIG. 3 illustrates the initial elongation of the bulb which occurs at station F. As soon as the initial forming operation is completed at station F, the housing 26 and forming head 27 are retracted, to permit indexing of the clamped tube with its formed bulb to station G. Again the housing 26 is moved toward the turret and the second forming head placed over the still molten tube end to further work the glass at station G. The process is repeated and the forming heads are retracted from over the tube ends each time the turret indexes. FIG. 4 shows the final bulb form which occurs as the turret indexes to station G. At station H, the bulb does not further elongate, however, the vacuum versus atmosphere condition is maintained so that the bulb will not collapse as it cools. By performing the bulb-forming operations over several work stations the speed of production is greatly increased.

A small amount of cooling takes place at station I as the turret indexes away from the warm molds to assure that the end of the bulb will not be deformed when the tubing is advanced against a stop at station J. At station J the bulb is cut to a desired size by wheel 31. The turret 10 then indexes through spare stations K to P before beginning another cycle.

As noted, the jet air stream from passageways 48 is adjusted at an angle over the molten end of the tube so as to miss the glass surface as the glass end gradually enlarges and extends outwardly to bulb shape while at the same time maintaining an effective vacuum in the recess of collar 47a. The diameter of the recess 47, and the height of collar 47a, can also be selected to guide and confine the air stream so as to provide an optimum vacuum spot 49 over the molten tube end. The gas jets from passageways 48 also function to remove any broken glass chips or debris from the area of bulb formation and prevent any clogging of the air passageways.

While in accordance with the patent statutes, one best-known embodiment of the invention has been described, the invention is not to be limited thereto.

What I claim as new and desire to secure by Letters Patent of the United States is:

1. A method for shaping bulbs from ceramic tubing comprising the steps of:
   (a) heating one open end of the tubing,
   (b) collapsing the heated end of the tubing inwardly toward the center of the tubing to form a molten closed end,
   (c) positioning said molten closed end in a forming head in a cavity having both ends open, said forming head containing a means for the flow of a pressurized gas, said molten closed end position being located with respect to the flow of pressurized gas such that said gas is directed to a point beyond the molten closed end,
   (d) applying a vacuum to the area around said molten closed end by directing a pressurized gas into said cavity in said forming head and directing the gas to a point forward of said molten end and out said opening,
   (e) exposing the other end of said tubing to atmospheric pressure, and
   (f) elongating said molten end into a rounded shape through the action of the pressure difference caused between said vacuum and the atmospheric pressure inside the tube.

2. The method claimed in claim 1 wherein said pressurized gas is directed to a point beyond said closed end in a conical configuration.

References Cited
UNITED STATES PATENTS

| | | | |
|---|---|---|---|
| 1,532,077 | 3/1925 | Quackenbush et al. | 65—280 X |
| 1,643,215 | 9/1927 | Koenig | 65—279 |
| 1,838,161 | 12/1931 | Soubier | 65—110 |
| 1,859,011 | 5/1932 | Wales | 65—110 |
| 3,179,508 | 4/1965 | Stapel | 65—355 X |

ROBERT L. LINDSAY, JR., Primary Examiner

U.S. Cl. X.R.

65—34, 280; 264—92; 425—388